(12) United States Patent
Harden et al.

(10) Patent No.: US 6,212,864 B1
(45) Date of Patent: Apr. 10, 2001

(54) NARROW ROW COTTON HARVESTER

(75) Inventors: Russell Jerrell Harden; Jerrell William Harden, both of Banks; Floyd Pascal Hicks, Ramer; Billy Paul Brown, Ozark, all of AL (US); Timothy Arthur Deutsch, Newton, IA (US); Richard Lee Forest, Colona, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/322,453

(22) Filed: May 28, 1999

(51) Int. Cl.⁷ .................................................. A01D 46/14
(52) U.S. Cl. ............................ 56/36; 56/35; 56/38; 56/41
(58) Field of Search .................................. 56/36, 38, 41, 56/42, 43, 44, 48, 49, 50, 30, 33, 34, 37, 29, 127, 330

(56) References Cited

U.S. PATENT DOCUMENTS

| | | | |
|---|---|---|---|
| 3,035,387 | 5/1962 | Bevill | 56/28 |
| 3,645,075 | 2/1972 | Kappelman et al. | 56/28 |
| 3,685,263 | 8/1972 | Kappelman et al. | 56/1 |
| 3,982,384 | * 9/1976 | Rohweder et al. | 56/106 |
| 4,009,557 | * 3/1977 | Reicks | 56/98 |
| 4,249,365 | * 2/1981 | Hubbard et al. | 56/13.2 |
| 4,269,017 | 5/1981 | deBuhr et al. | 56/106 |
| 4,470,245 | 9/1984 | Agadi | 56/28 |
| 4,538,403 | * 9/1985 | Fachini | 56/44 |
| 4,821,497 | 4/1989 | Deutsch et al. | 56/41 |
| 5,063,728 | * 11/1991 | Garter et al. | 56/13.5 |
| 5,115,628 | * 5/1992 | Garter et al. | 56/10.2 |
| 5,307,611 | * 5/1994 | Vardeman et al. | 56/10.2 |
| 5,519,988 | * 5/1996 | Copley et al. | 56/30 |
| 5,881,541 | * 3/1999 | Silver et al. | 56/98 |
| 5,881,542 | * 3/1999 | Togami et al. | 56/98 |
| 5,911,673 | * 6/1999 | Johnson | 56/94 |
| 5,924,269 | * 7/1999 | McMillen | 56/66 |
| 5,960,618 | * 10/1999 | Kerber | 56/119 |

\* cited by examiner

Primary Examiner—Robert E. Pezzuto
Assistant Examiner—Arpád Fáb Kovács

(57) ABSTRACT

Crop severing and gathering structure is pivotally connected to the forward end of a cotton row unit housing adjacent a row receiving area. A cutter severs the lower portion of cotton plants offset from the row receiving area of the row unit. A conveyer includes a pair of opposed belts with gripping features which embrace the lower portions of the stems of the cotton plants and move the severed plants in a generally upright position into the row of standing plants that is entering the row receiving area. The severed cotton plants intertwine with the standing row at the front of the housing as the conveyor moves the plants against one side of the row. The standing row with intertwined plants enters the row receiving area, and tandem picking drums located on the same side of the row as the severing and gathering structure remove cotton from both the standing row and the severed plants. The opposed belts have surfaces which enhance the gripping and conveying of the severed plants, and rotating brushes above the cutters help gather and hold the plants in the upright position for cutting. The pivotal connection allows the severing and gathering structure to be adjusted to the desired lateral position for a given plant spacing and to be lifted out of the way for convenient access to areas in and near the housing, including access to the row unit door structure. Plant gatherers at the leading end of the severing and gathering structure can be adjusted for alignment with the forward direction when the lateral position of the structure is adjusted for different plant spacings.

30 Claims, 3 Drawing Sheets

NARROW ROW COTTON HARVESTER

BACKGROUND OF THE INVENTION

1) Field of the Invention

The present invention relates generally to cotton harvesters and, more specifically, to a row unit structure for harvesting narrowly spaced cotton plants.

2) Related Art

Cotton harvesters for picking cotton typically include a row harvesting unit having upright spindle drums and doffer columns for picking a row of cotton from plants that enter a row-receiving area in a support housing. The housing is relatively large and carries numerous driven components necessary for the picking and doffing functions. Providing picker row units that can harvest adjacent cotton rows in narrowly spaced cotton rows of fifteen inches (38 cm.) or less without plant damage and cotton loss in one of the rows has been a continuing problem because of the space requirements for the components. Cotton picker units such as shown in commonly assigned U.S. Pat. No. 4,821,497 with picker drums supported in tandem on one side only of the row, or nested row harvesting units as shown in U.S. Pat. No. 4,538,403 have provided row harvesting capability for some narrow row spacings, but the reduction has not been sufficient to accommodate very narrowly spaced rows of fifteen inches or less. As row spacings decrease and the area around each row unit decreases, accessing service areas on the row units and providing adequate cotton door and conveying structure become increasingly difficult.

A further problem with current cotton harvesters has been under-utilization of row unit capacity in low yield conditions. In low yield cotton, the row units often operate at only a small fraction of their maximum capacity.

BRIEF SUMMARY OF THE INVENTION

It is therefore an object of the present invention to provide an improved cotton harvester row unit structure that overcomes most or all of the above-mentioned problems. It is another object to provide such a structure that facilitates harvesting cotton from adjacent rows or areas of narrowly spaced cotton plants. It is yet another object to provide such a row unit structure that provides increased row unit utilization in low yield cotton conditions. It is still another object to provide such a structure that is light in weight, relatively inexpensive and easy to adjust for different plant spacings and which is easy to access for maintenance, clean-out and repair.

It is yet a further object of the present invention to provide an improved cotton harvester row unit structure wherein a row unit harvests the cotton from more that one row of cotton. It is still another object to provide such structure which can harvest two adjacent rows of cotton spaced fifteen inches (38 cm.) or less. It is yet another object to provide such a harvester which is adjustable to accommodate different adjacent row spacings and which includes an attachment which can be easily moved to a storage position when not needed for harvesting adjacent cotton from adjacent plants. It is still another object to provide such an attachment which can move vertically to follow ground contours.

It is yet another object of the present invention to provide an attachment for the row unit structure of a cotton picker to provide up to twice the normal row capacity of the picker without increasing the number of row units. It is a further object to provide such an attachment which is relatively inexpensive and light in weight and which can be easily fitted to conventional row unit structure with only minor modifications to the structure. It is yet another object to provide such an attachment which is easily adjustable for different plant spacings and easy to move for storage or access to the row unit service doors.

It is a further object of the present invention to provide an improved cotton harvester having increased row capacity but which is substantially less expensive than harvesters with individual row units for each row. It is a further object to provide such a structure which is lighter and more compact than at least most previously available harvester of equal row capacity and which can harvest adjacent rows of cotton with row spacings of fifteen inches (38 cm.) or less. It is a further object to provide such a harvester with easily adjustable row unit structure for accommodating different row spacings and for easy access to service areas on the structure. It is still another object to provide such a harvester wherein space for cotton door and duct structure is maximized.

A cotton harvester includes a plurality of row harvesting units adjustably spaced on a row unit support. Each unit includes a framed housing defining a row receiving area with conventional picking, doffing and door structure for removing cotton bolls from a row of cotton plants entering the area and conveying the cotton towards a basket. Crop severing and gathering structure is pivotally connected to the frame at the forward end of the harvesting unit housing adjacent the row receiving area and includes a cutter for severing the lower portion of cotton plants offset from the row entering the row receiving area. A conveyer includes a pair of opposed belts with gripping features which embrace the lower portions of the stems of the cotton plants and move the severed plants in a generally upright position into the row of standing plants that is entering the row receiving area. The severed cotton plants intertwine with the standing row at the front of the housing as the conveyor moves the plants against one side of the row. The standing row with intertwined plants enters the row receiving area so the picking drums can remove cotton from both the standing row and the severed plants. The opposed belts have surfaces which enhance the gripping and conveying of the severed plants, and rotating brushes can be added above the cutters to help gather and hold the plants in the upright position for cutting. The cutters preferably include a sharpened disk and a complimentary overlapping serrated disk to efficiently sever the plants below the gripped portions. The opposed belts facilitate efficient cutting of the plants and reduce pulling of roots and problems associated therewith, and additional rotating brush elements above the cutters and belts may be added for extra support and guidance as the plants enter the cutting area of the crop severing and gathering structure.

The crop severing and gathering structure is preferably located on the same side of the row receiving area as tandem spindle drums to effectively utilize the space forward of the housing area that supports the drums and facilitate harvesting cotton plants laterally spaced a relatively short distance from the plants entering the row receiving area. The pivotal connection allows the severing and gathering structure to be adjusted to the desired lateral position for a given plant spacing which can be as little as fifteen inches or less and which can be increased to harvest cotton spaced thirty inches or more from first row. The structure may also be lifted out of the way for convenient access to areas in and near the housing, including access to the row unit door structure. Increased productivity as a result of narrower row spacings and increased utilization of row unit capacity, even in fields with row spacings on the order of thirty inches, can be achieved without a substantial increase in cotton harvester cost. The pivotal connection also allows the severing and gathering structure to be adjusted vertically or float relative to the row unit for better height control.

These and other objects, features and advantages of the present invention will become apparent to one skilled in the art upon reading the following detailed description in view of the drawings.

DETAILED DESCRIPTION OF THE DRAWINGS

Figure 1:
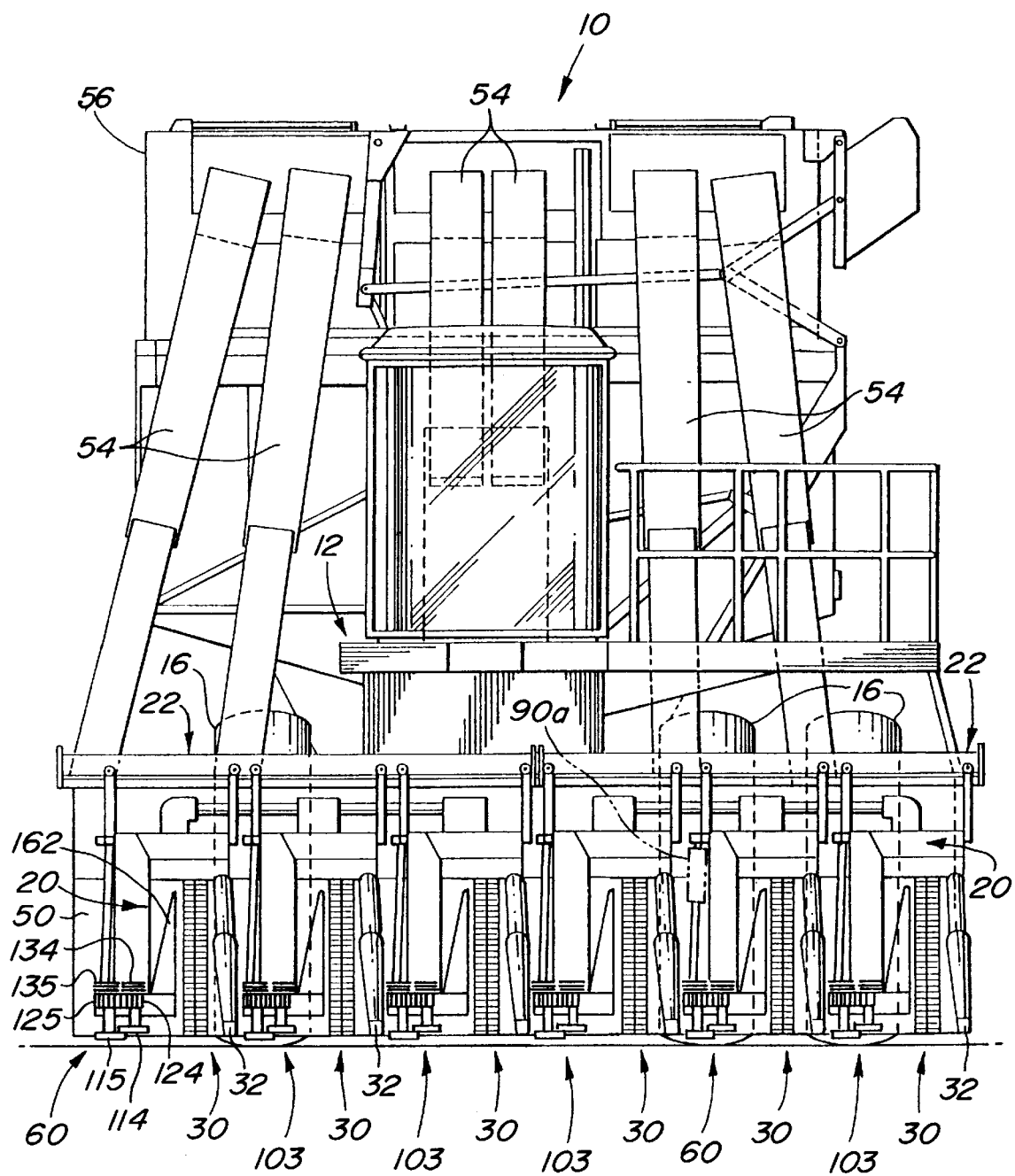
FIG. 1 is a front view of a cotton harvester with crop severing and gathering structure attached to laterally spaced row units.
Figure 3:
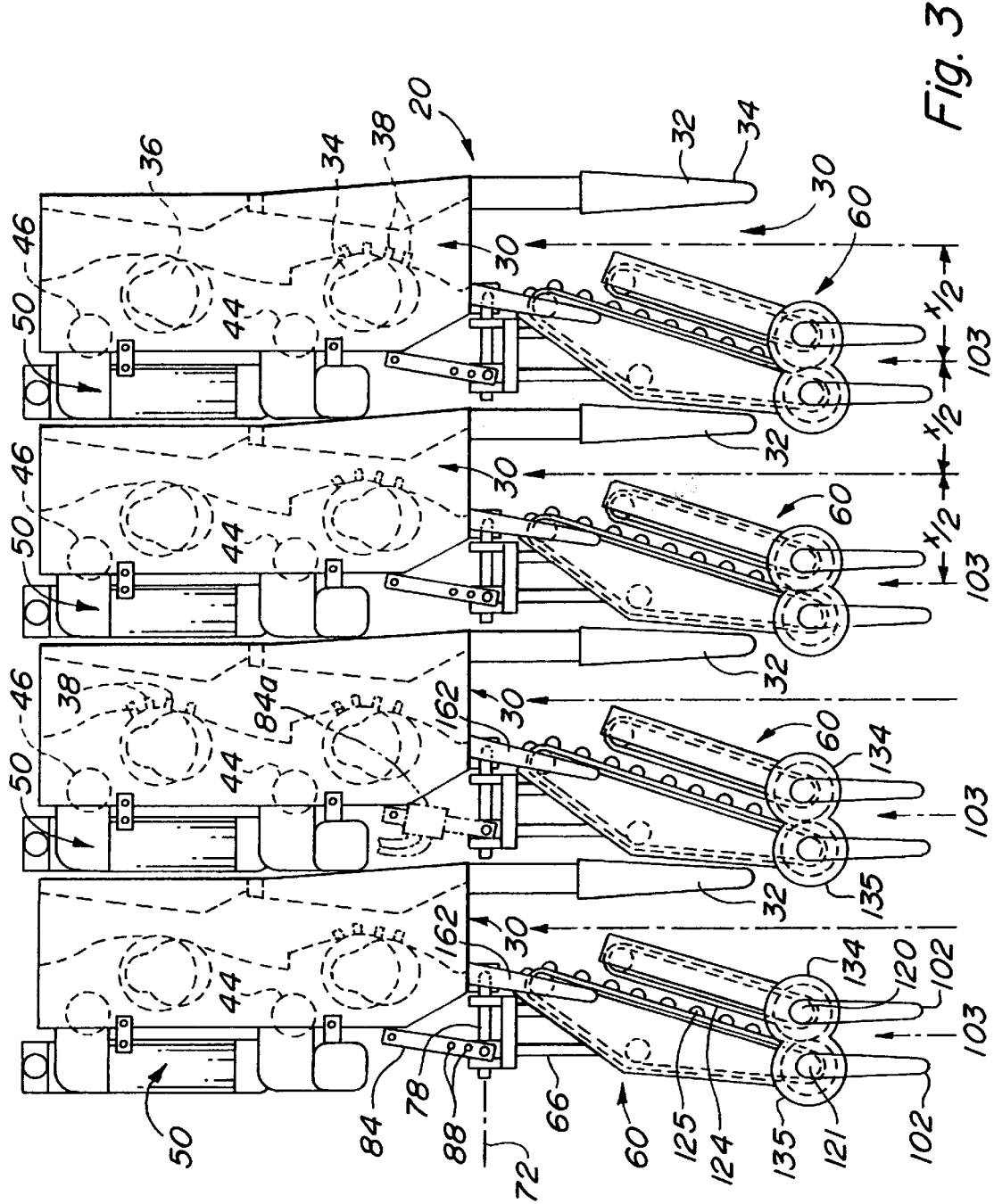
FIG. 3 is a top view of the forward portion of a four row cotton harvester with crop severing and gathering structure supported from the row units to harvest cotton planted in uniformly spaced narrow rows.

Referring now to FIG. 1, therein is shown a cotton harvester 10 having a main frame 12 supported for forward movement over a field of cotton plants by wheels 16. A plurality of transversely adjustable row harvesting units 20 are supported from vertically moveable row unit frames 22 connected to the forward end of the main frame 12. Each of the row units 20 includes a main row receiving area 30 adapted for alignment with a row of cotton plants to be harvested. A plant gatherer 32 projects forwardly on one side of the row receiving area 30. As shown in FIG. 3, each of the row units 30 includes front and rear spindle drums 34 and 36 arranged in tandem on one side only of the row receiving area 30 (the side opposite the plant gatherer 32) with projecting spindles 38 for removing cotton bolls from the plants. Corresponding front and rear doffer columns 44 and 46 doff the cotton from the spindles of the drums 34 and 36 and direct the cotton into door structure indicated at 50. A conventional air system (not shown) propels the cotton from the door structure 50 through ducts 54 to a basket 56 supported on the frame 12. As shown in FIG. 1, six units 20 are supported from the frame 22, although the system described below can be used with any number of units.

To provide increased harvesting capability without increasing the number of row units 20 and for harvesting narrowly spaced cotton plants, plant severing and conveying structure 60 is connected to the forward portion of the row units 20 on the same side of the row receiving area 30 as the tandem drums 34 and 36. The structure 60 severs cotton plants offset from the plants entering the row receiving area 30 and moves the severed plants in an upright position into the standing cotton plants at the front of the unit 20 as the standing plants enter the area 30. The tandem drums 34 and 36 then remove the cotton bolls from both the standing plants and the severed plants.

Each of the structures 60 includes a pivot assembly 62 (FIGS. 2 and 3) connected to the frame of the row unit 20 adjacent the row receiving area 30 and forward of the tandem drums 34 and 36. A structure frame 66 is connected to the pivot assembly 62 for pivoting inwardly and outwardly relative to the row receiving area 30 about an upright axis 70. The frame 66 also pivots about a generally horizontally extending axis 72 for raising and lowering the forward end of the frame 66 to adjust the operating height of the structure 60 and to permit the structure to be pivoted upwardly for better access to the row harvesting unit 20.

The frame 66 includes an aft end with transversely spaced pivot links 74 and 76 connected to a pivot shaft 78 defining the axis 72. The pivot shaft 78 is connected to a bracket 82 for rocking about the axis 70. A diagonal link 84 is pivotally connected to an aft bracket 86 on the row unit housing 20 and to the outer end of the pivot shaft 78 to adjustably secure the shaft against rotation about the axis 70. The link 84 includes a plurality of apertures 88 for varying the angular position of the structure 60. A diagonal support member 90 (FIG. 2) has an upper aft end connected at 92 to the upper forward portion of the row unit 20. The member 90 extends downwardly and forwardly to a connection at 96 to the frame 66 forwardly of the pivot shaft 78. The support member 90 preferably is an adjustable length member such as a cylinder or the like to selectively maintain the frame 66 as a fixed relationship relative to the row unit 20 or provide float and/or vertical adjustment of the forward end of the frame 66 relative to the unit 20. The member 90 also permits the frame 66 to be raised for access to the unit 20.

The forward end of the frame 66 pivotally supports a pair of plant gatherers 102 which define a plant receiving area 103 offset on the drum side of the row unit 20 from the receiving area 30. Fore-and-aft extending linkages 106 extend rearwardly from the gatherers 102 under the frame 66 to a quadrant or similar angular adjustment structure 110 for adjusting the gatherers for alignment with the fore-and-aft direction (FIG. 3) when the angular position of the frame 66 is adjusted about the axis 70.

First and second overlapping cutting disks 114 and 115 with sharpened edges are supported for rotation about upright axes on opposite sides of the receiving area 103. The disk 115 is serrated to assist in severing the plants that align with and enter the area 103. The disks 114, 115 are mounted at the lower ends of upright shafts 120 and 121 (FIGS. 2 and 3) journalled at the forward end of the frame 66. First and second counter-rotating feed belts 124 and 125 are trained around cylindrical drums 130 fixed for rotation with the shafts 120 for gripping and conveying the severed plants rearwardly and inwardly towards the row receiving area 30. As shown, cylindrically shaped, overlapping brushes 134 and 135 are connected to the upper ends of the shafts 120, 121 above the belts 124 and 125, respectively. The brushes counter-rotate to urge the plants between the belts and help to hold the plants upright as the disks 114,115 sever the stalks near ground level.

Figure 2:
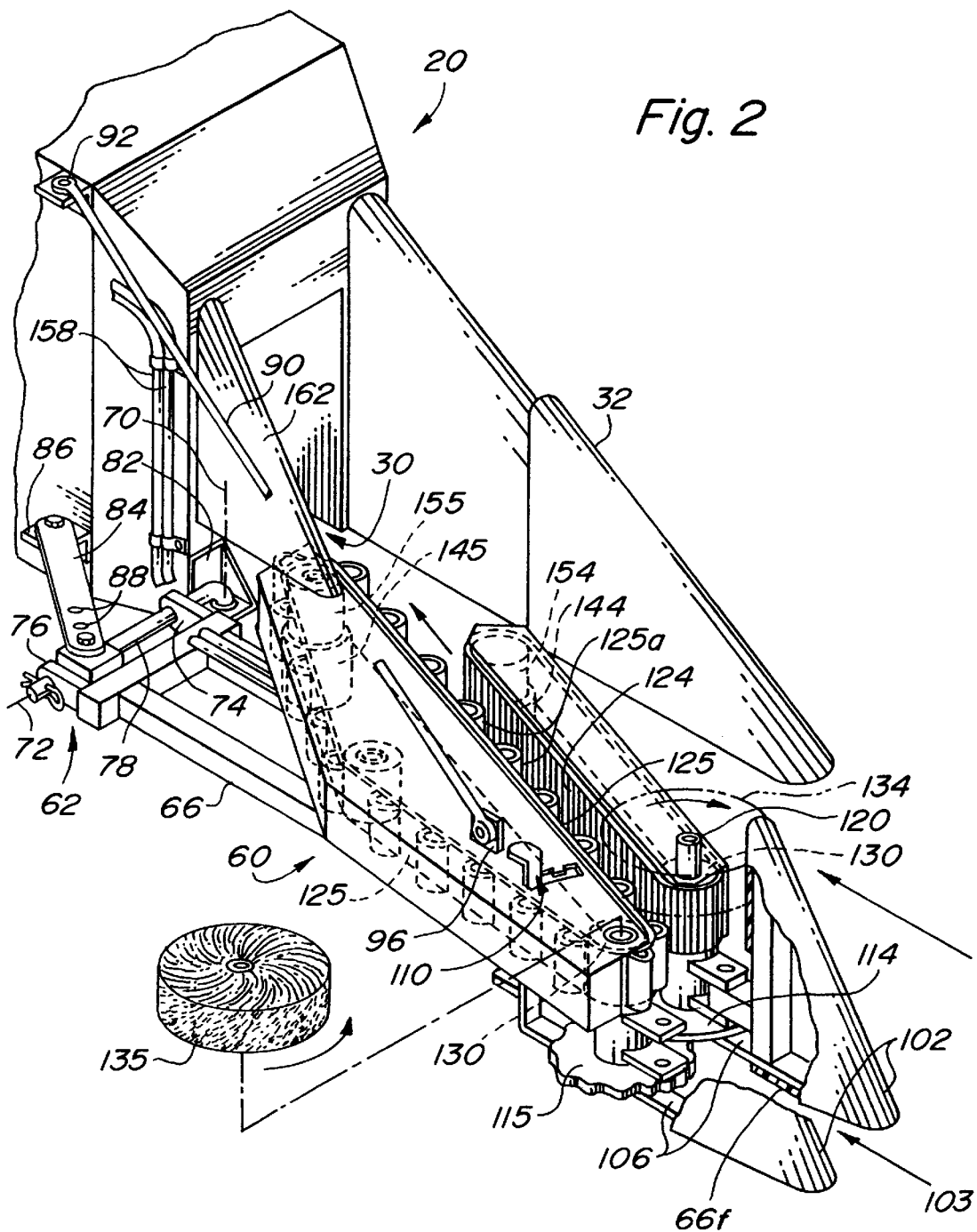
FIG. 2 is a perspective view of a crop gathering and severing structure, partially broken away to better show the details of construction.

As shown in FIG. 2, drive to the cutting disks 114 and 115, the belts 124 and 125 and the brushes 134 and 135 are provided by hydraulic motors 144 and 145 connected to rear drive drums 154 and 155 which receive and drive the belts 124 and 125 near the entrance of the row receiving area 30 into the housing 20. A conventional hydraulic system (not shown) including a source of hydraulic fluid under pressure on the harvester 10 connected through a control valve and flexible hoses 158 provides drive to the motors 144 and 145 to drive the belts 124 and 125 at generally the same speeds. The belts 124,125, in turn, drive the forwardly located cutters 114,115 and the brushes 134,135. Other conventional drive systems may also be employed, including drives with chains connecting the cutters and drive drums. The belt 125 is shown with half-cylinder projections 125a which help to grasp and hold the lower portions of the cotton plants closely adjacent the ground. The belts 124 and 125 extend continuously from the plants offset from the first row to the opening in the row unit housing 20 which receives the first row. A shortened plant gatherer 162 extends forwardly from the attachment side of the row unit 20 to a location adjacent the rearward portion of the belt 125 to help direct the severed cotton plants and upright the uncut cotton row before entering the row unit.

As shown in FIG. 3, a harvester with four row units 20 having row receiving areas 30 for harvesting rows transversely spaced a distance x is adapted for harvesting eight rows spaced a distance x/2 apart. FIG. 1 shows a twelve row machine. The plant receiving areas 103 of the plant severing and conveying structures 60 are aligned with the rows between the areas 30. Each quadrant 110 is adjusted for alignment of the plant gatherers 102 with the fore-and-aft direction. As the operator drives the harvester 10 forwardly over the field, the lower portions of the cotton plants passing between the gatherers 102 are severed by the rotating disks 114, 115 as the brushes 134, 135 help hold the upper portions of the plants and direct the plants between the moving belts 124, 125. The belts hold the severed plants in an upright position and direct them into the standing row entering the corresponding row receiving area 30. The gatherers 32 and 162 direct the standing row together with the intertwined severed plants into the row unit 20 for removal of the cotton bolls from the plants.

Conventional row unit height adjusting structure (not shown) preferably is connected to the row units 20 to maintain both the unit 20 and the structure 60 the proper distance above the ground to maximize crop harvesting efficiency while avoiding excessive ground contact. For added flexibility, a separate height control adjustment may be provided for the structure 60 for use when the member 90 includes a cylinder or similar motor structure (see 90a of FIG. 1) for independent vertical adjustment relative to the corresponding row unit 20. The structure 60 can also be allowed to float to follow the ground contour by providing a skid (66f of FIG. 2) or other ground contact device such as a wheel on the frame 66 and providing telescoping action for the member 90 or a float position on the control to the cylinder 90a. Also, the link 84 may be replaced with a cylinder or other type of motor structure (see 84a of FIG. 3) and connected to a row finder adjacent the row receiving area 103 for automatic on-the-go lateral adjustment of the structure 60 to align the area 103 with the cotton plants offset from the plants entering the row receiving area 30, particularly when the offset plants are more randomly spaced relative to that row. For an example of a row finder, reference may be had to U.S. Pat. No. 5,307,611 entitled VEHICLE STEERING CONTROL SYSTEM. To convert the twelve row harvester of FIG. 1 to six row conventional machine, or to convert the eight row harvester of FIG. 3 to a four row conventional machine, the structures 60 may be pivoted upwardly toward upright storage positions. The independent hydraulic drive system including flexible hoses connected to the structures 60 provides flexibility necessary for height and spacing adjustments and storage features described above.

Having described the preferred embodiment, it will become apparent that various modifications can be made without departing from the scope of the invention as defined in the accompanying claims.

What is clamed is:

1. A cotton harvester row unit adapted for movement in a forward direction over ground where first and second rows of standing cotton plants are grown:
   a row unit housing have a fore-and-aft extending row receiving area having a forward end receiving the first row of standing cotton plants;
   harvesting structure carried by the housing adjacent the row receiving area for removing cotton from the first row of standing cotton plants, the harvesting structure including an upright spindle drum with spindles projecting into one side of the row receiving area; and
   plant conveying structure connected to the row unit housing and extending outwardly therefrom, including a frame supporting a plant severing device outwardly of the row receiving area for cutting of standing plants offset from the first row, and a conveyor supported from the frame and extending between the plant severing device and the one side of the row receiving area, the conveyor angled from the forward direction from the plant severing device towards the forward end and moving cut plants into the plants of the first row at the forward end of the row receiving area so the spindles engage both the first row of standing plants and the cut plants.

2. The row unit as set forth in claim 1 including a pivot having an upright axis connecting the frame to the row unit housing, wherein the plant conveying structure is adjustable transversely relative to the housing about the upright axis for alignment with the second row to cut the second row and to accommodate different spacings between the first and second rows of plants.

3. The row unit as set forth in claim 1 wherein the plant severing device includes a cutter adapted for severing the plants near ground level and the conveyor includes an endless belt element having a plant engaging portion engaging lower portions of the severed plants and moving the severed plants in an upright attitude towards the forward end of the row receiving area.

4. The row unit as set forth in claim 1 including a stalk lifter extending forwardly from the housing adjacent one side of the row receiving area, wherein the plant conveying structure is supported from the housing on said one side of the plant conveying structure and includes opposed belts embracing lower portions of the plants.

5. The row unit as set forth in claim 3 wherein the endless belt element includes a belt having a plurality of projections facilitating support of the lower portions of the plants adjacent ground level, the belt extending continuously from the cutter to a location adjacent the forward end of the row receiving area at the one side of the row receiving area.

6. The row unit as set forth in claim 1 wherein the conveyor comprises a belt structure having projections facilitating gripping of the cut plants adjacent the ground, the belt extending at an angle to the forward direction from the plant severing device to a location adjacent the forward end of the row receiving area.

7. A cotton harvester row unit adapted for forward movement over ground where cotton plants are grown in rows:
   a row unit housing have a fore-and-aft extending row receiving area receiving a first row of cotton plants;
   harvesting structure carried by the housing including an upright spindle drum located adjacent the row receiving area and including spindles projecting into the row receiving area for removing cotton from the first row of plants;
   plant conveying structure connected to the row unit housing and extending outwardly therefrom, the plant conveying structure including a plant severing device for cutting of plants offset from the first row and a conveyor moving cut plants into the plants of the first row at the forward end of the row receiving area; and
   wherein the plant conveying structure includes a frame and pivot structure pivotally connecting the frame to the housing, the pivot structure including a first pivot having an upright axis and connecting the frame to the housing for pivoting about the upright axis for accommodating the plants offset from the first row of plants, and a second pivot having a generally horizontal axis connecting the frame for pivoting relative to the housing about the horizontal axis.

8. The row unit as set forth in claim 7 wherein the pivot structure comprises an angled member having a first leg connected to the housing and defining the first pivot and a second lea extending horizontally from the first leg and defining the second pivot, wherein the frame is pivotable about the upright axis to accommodate different spacings between the first and the second rows.

9. The row unit as set forth in claim 7 further comprising an adjustment member extending between the frame and the housing and securing the frame in a preselected angular position relative to the housing, wherein the frame, when secured in the preselected angular position, is pivotable about the horizontal axis and to provide access to areas on and adjacent the housing.

10. The row unit as set forth in claim 7 wherein the housing includes a pivot receiving area adjacent the forward end of the row receiving area and wherein the pivot structure is supported from the pivot receiving area, and the conveying structure further includes first and second belts embracing lower portions of the plants offset from the first row, wherein the belts are pivotable with the frame relative to the housing.

11. A method of harvesting upright cotton plants, the method comprising:
   supporting a row harvesting unit including a row receiving opening and rotatable spindles from a mobile frame;
   attaching a gathering member at one side of the row receiving opening so the gathering member extends forwardly and outwardly from the one side of the row harvesting unit;
   moving the row harvesting unit in a forward direction through the cotton so a first row of cotton plants enters the row receiving area in substantially an uncut upright position for harvesting by the unit;
   severing cotton plants adjacent the first row of cotton plants;
   driving the gathering member to move the severed cotton plants at an angle relative to the forward direction into the first row of cotton plants as the first row of plants enters the row receiving area in the uncut upright position; and
   rotating the spindles in the severed cotton plants and the uncut first row of plants in the row receiving area to remove cotton from the plants.

12. The method as set forth in claim 11 wherein the step of attaching includes pivotably mounting the gathering member to the row harvesting unit and adjusting the angle of the gathering member relative to the forward direction into alignment with cotton plants adjacent the first row of cotton plants.

13. The method as set forth in claim 11 wherein the step of attaching a gathering member includes movably supporting the gathering member from the row harvesting unit and providing access to the row harvesting unit by moving the gathering member relative to the row harvesting unit while maintaining support of the gathering member from the row harvesting unit.

14. The method as set forth in claim 11 wherein the step of supporting a gathering member includes extending a belt from the row receiving opening outwardly to the cotton plants adjacent the first row of cotton plants, and gripping lower portions of the cotton plants with the belt during the step of severing.

15. The method as set forth in claim 14 wherein the step of severing includes rotating a disk in contact with the lower portions of the cotton plants.

16. The method as set forth in claim 14 including continuously gripping the lower portions of the cotton plants with the belt as the cotton plants are severed and as the plants are moved into the first row.

17. The method as set forth in claim 14 including rotating a flexible wheel member above the belt to thereby help support the cotton plants in an upright position during the step of severing.

18. The method as set forth in claim 15 wherein the step of driving the gathering member includes connecting the belt to a hydraulic drive and further including the step of rotating the disk with the hydraulic drive.

19. The method as set forth in claim 11 wherein the step of severing includes rotating a pair of overlapping blade members and moving lower portions of the cotton plants between rotating blade members.

20. The method as set forth in claim 19 wherein the step of severing includes supporting portions of the plants above the rotating blade members from opposite sides of the plant.

21. A method of harvesting upright cotton plants, the method comprising:
   supporting a row harvesting unit including a row receiving opening from a mobile frame;
   attaching a gathering member at one side of the row receiving opening so the gathering member extends forwardly and outwardly from the harvesting unit;
   moving the row harvesting unit forwardly through the cotton so a first row of cotton plants enters the row receiving area for harvesting by the unit;
   severing cotton plants adjacent the first row of cotton plants;
   driving the gathering member to move the severed cotton plants into the first row of cotton plants as the first row of plants enters the row receiving area; and
   wherein the step of supporting a row harvesting unit includes supporting spindle drum structure on one side only of the row receiving area, and wherein the step of attaching a gathering member includes attaching the gathering member on said one side only of the row unit housing.

22. The method as set forth in claim 21 including the step of continuously gripping the lower portions of the cotton plants, the step of continuously gripping including confining the lower portions between two moving belts.

23. The method as set forth in claim 21 including the step of adjusting the gathering member over a range of alignment to harvest cotton plants spaced between fifteen and thirty inches from the first row of cotton plants.

24. The method as set forth in claim 21 including the step of providing an adjustable plant gatherer located on a side of the receiving area, and adjusting the gatherer for alignment of the gatherer with the forward direction.

25. A cotton harvester harvesting unit adapted for movement in a forward direction of travel over ground where cotton plants are grown:
   a row unit housing having a fore-and-aft extending receiving area, first and second sides and a forward end, the forward end receiving a first row of standing cotton plants;

harvesting structure carried by the housing adjacent the first side of the receiving area, the harvesting structure including an upright spindle drum with spindles projecting into the first side of the receiving area for removing cotton from the first row of standing cotton plants;

plant conveying structure connected to and extending outwardly and forwardly from the housing, the plant conveying structure including a proximate end located adjacent the first side and a plant receiving end forwardly and outwardly of the proximate end for receiving and moving plants offset from the first side to the first side of the receiving area and into the plants of the first row; and a plant gatherer connected to the row unit housing and extending forwardly from the second side of the receiving area and generally parallel to the forward direction of travel to thereby passively guide the first row of standing cotton plants into the receiving area as the plant conveying structure moves the plants offset from the first side to the first side of the receiving area.

26. The harvesting unit as set forth in claim 25 wherein the plant conveying structure includes pivot structure having an upright axis connecting the proximate end to the housing adjacent the forward end, and adjustment structure connected between the plant conveying structure and the housing adjustably securing the plant conveying structure in one of a plurality of angular positions, wherein the angle of the adjustable plant gatherer can be changed when the conveying structure is pivoted about the upright axis to maintain a preselected alignment of the conveying structure with the forward direction.

27. The harvesting unit as set forth in claim 25 including pivot structure having a horizontal axis connecting the proximate end to the housing, and wherein the plant conveying structure is pivotable about the horizontal axis so that the height of the plant receiving end is adjustable relative to the housing.

28. The harvesting unit as set forth in claim 27 including motor structure for pivoting the plant conveying structure vertically about the horizontal axis relative to the housing.

29. The harvesting unit as set forth in claim 25 including motor structure connected to the plant conveying structure to provide on-the-go adjustment of the plant conveying structure relative to the receiving area.

30. The harvesting unit as set forth in claim 29 wherein the plant conveying structure includes an independent hydraulic drive flexibly connected to the row unit housing.

* * * * *